United States Patent [19]

Clarke et al.

[11] Patent Number: 4,967,345
[45] Date of Patent: Oct. 30, 1990

[54] METHOD OF SELECTING LEAST WEIGHT ROUTES IN A COMMUNICATIONS NETWORK

[75] Inventors: Kathryn E. Clarke, Little Silver, N.J.; John E. Drake, Jr., Pittsboro, N.C.; Diane P. Pozefsky; William E. Siddall, both of Chapel Hill, N.C.

[73] Assignee: International Business Machines Corporation, Armonk, N.Y.

[21] Appl. No.: 210,471

[22] Filed: Jun. 23, 1988

[51] Int. Cl.$^5$ ............................................. H04Q 11/00
[52] U.S. Cl. ................................. 364/200; 364/284.4; 364/284.3
[58] Field of Search ........................ 364/200 MS File

[56] References Cited

U.S. PATENT DOCUMENTS 4,466,060  8/1984  Riddle ................................. 364/200
4,679,189  7/1987  Olson et al. ........................... 370/60
4,748,660  5/1988  Deveze ................................. 379/272

Primary Examiner—Clark A. Jablon
Attorney, Agent, or Firm—Gerald R. Woods

[57] ABSTRACT

A least weight route computation algorithm for use in computing routes through a data communications network is improved by recording the number of equally weighted paths to a particular node through different predecessor nodes. If a route must be selected to the particular node, the relative numbers of equally weighted routes through different predecessor nodes determines the probability with which a route will be selected through the particular predecessor node.

5 Claims, 3 Drawing Sheets

FIG. 2
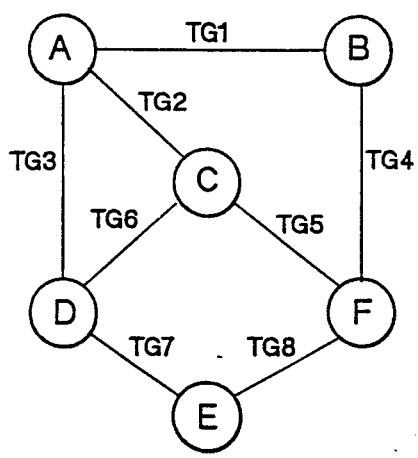
FIG. 3
| WEIGHTS | | | |
|---|---|---|---|
| NODE | WEIGHT | TG | WEIGHT |
| A | 8 | 1 | 5 |
| B | 6 | 2 | 15 |
| C | 8 | 3 | 20 |
| D | 2 | 4 | 10 |
| E | 6 | 5 | 10 |
| F | 4 | 6 | 15 |
|   |   | 7 | 5 |
|   |   | 8 | 5 |
FIG. 4
FIG. 5
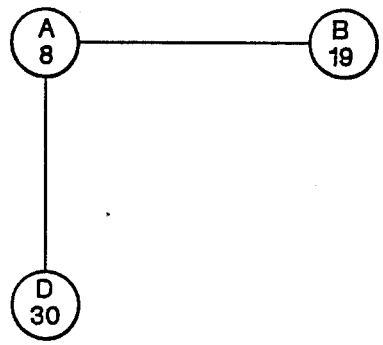
FIG. 6
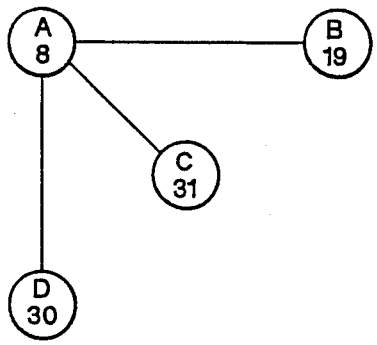
FIG. 7
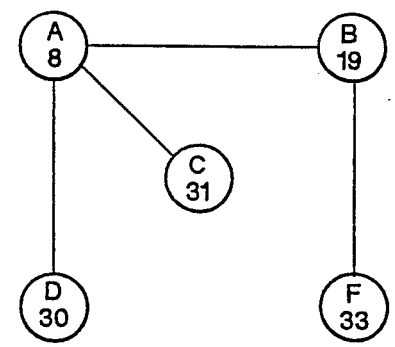

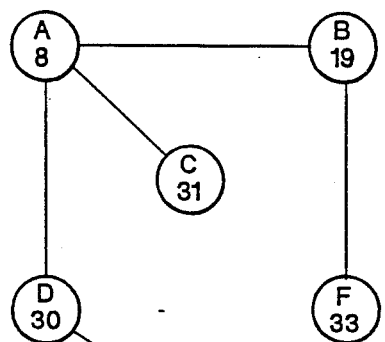
FIG. 8
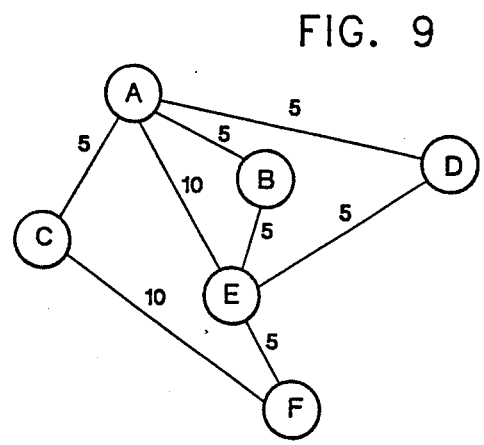
FIG. 9
FIG. 10
| NODE | LEAST WEIGHT ROUTES | WEIGHT |
|---|---|---|
| F (4) | EA | 15 |
| | EBA (3) | 15 |
| | EDA | 15 |
| | CA (1) | 15 |

METHOD OF SELECTING LEAST WEIGHT ROUTES IN A COMMUNICATIONS NETWORK

FIELD OF THE INVENTION

The present invention relates to data communications networks and more particularly to a method for selecting paths from equally-weighted least weight paths during computation of routes through such networks.

For purposes of the following descriptions, a communications network can be generally defined as a collection of network nodes and end nodes interconnected through communications links. A network node can be characterized as a data processing system that provides certain functions within the network, such as routing of messages between itself and its adjacent or neighboring nodes, selection of routes for messages to be transmitted between two nodes and the furnishing of directory services to connected end nodes. The link between nodes may be permanent communications links such as conventional cable connections or links that are enabled only when needed, such as dial-up telephone connections. End nodes are exemplified by devices such as display terminals, intelligent workstations, printers and the like which do not provide routing or route selection or directory services to other nodes in the network. Collectively, the network nodes, the end nodes and the links between the nodes are referred to as network resources. The physical configuration and characteristics of the various nodes and links in a network are said to be the topology of the network.

For a user at one node to exchange data with another user at another node, a path or route must be set up through the network. The route will include the node at which the first user is located (the origin node), the node at which the second user is located (the destination node), possibly one or more network nodes and the links or transmission groups which connect the nodes on the route. A transmission group is normally defined as a set of parallel links with similar characteristics that form a single logical link that has a higher capacity than each of the individual links in the group. For purposes of the following discussion, it should be assumed that the term transmission group can also contemplate a single physical link. The terms are used interchangeably in the following description.

In an ideal network, data provided by a first user is transmitted to a second user at no cost, with zero delays, with perfect reliability and with complete security regardless of how many nodes and transmission groups might be included in the route between the two users. Unfortunately, real data communications networks lack these ideal characteristics. Varying amounts of delays may be introduced over different routes. Some types of transmission groups may cost more to use or introduce more delay than others. The integrity of transmitted data may be protected better on some transmission groups than others. Other "imperfections" not even discussed above exist in a real network.

Because nodes and transmission groups in a real network possess different characteristics, it is a common practice to assign weights to both nodes and transmission groups and to use the assigned weights in computing optimal or least weight routes through the network from one user to another. The weight generally reflects how closely a given node or transmission group meets a predetermined standard of performance. For example, if weights were to be assigned on the basis of delay characteristics alone, a high-delay transmission group would have a greater assigned weight than a low-delay transmission group.

In determining a "best" route through a network from a first user at one node to a second user at another node, the weights of nodes and transmission groups in various potential routes are summed. The route having the lowest total weight, which is understandably referred to as the least-weight route, is considered to be the "best" route between the users.

Given an origin node, a destination node, and a specified class of service, a conventional least weight route computation algorithm always computes a single least weight path from the origin node to the destination node. If the network topology is stable (that is, the characteristics of the network nodes and intermediate routing transmission groups do not change), the same path is computed over and over again for a given origin node, destination node and class of service. If there actually is only one least weight that path between the origin node and the destination node, the fact that path is always selected by the route computation algorithm is clearly not a problem.

However, there may be multiple paths of the same least weight between an origin node and a destination node for a given class of service. If ties between multiple paths are always broken in the same way during computation of a route, the algorithm will always select the same path for every route request. Thus, one of the multiple, equally-weighted paths may potentially be overloaded to the exclusion of other least weight paths. As a result, the other paths will not be fully utilized for no justifiable reason.

One way to force more even utilization of network paths is to detect congestion on a given path and include congestion information in the node and transmission group characteristics stored in the topology databases. The disadvantage of this approach is that the congestion information is necessarily after the fact information based on the fact undesirable congestion has already occurred.

DISCLOSURE OF THE INVENTION

The present invention is an improved method for more effectively selecting different routes from a set of equally-weighted routes during route computation.

The method comprises the steps of beginning a route computation tree with a selected root node. A set of network node - transmission group pairs connecting network nodes not yet in the tree to a node in the tree is established. The weights of paths from the root node in the tree to each node in the set is calculated. The node with the least weight path from the root node is added to the tree in the following manner. If there is only one path from the root node to the given node with a least weight, that path is selected. If multiple paths to from the root node to the given node have equal least weights, one of those multiple paths is selected in a quasi-random operation. The selected node and transmission group connecting it to the tree are transferred to the tree. Other network node-transmission group pairs in the set for the transferred node are removed from the set. The steps outlined above, with the exception of the initial step of starting the tree with a selected root node, are repeated until all nodes in the network have been transferred to the tree.

DISCLOSURE OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

FIG. 2 is a node map of a six-node network which will be used to illustrate the computation of least weight routes;

FIG. 3 is a weight table showing the weights assigned to the various nodes and transmission groups of the network shown in FIG. 2;

FIGS. 4 through 8 show the various stages of a tree constructed through the application of a least weight algorithm to the network defined by FIGS. 2 and 3;

FIG. 9 is a node map showing a different network that will be used to illustrate the allocation of routes among sets of equally-weighted routes; and FIG. 10 is a weight table which is used in conjunction with FIG. 9.

TECHNICAL DESCRIPTION

Figure 1:
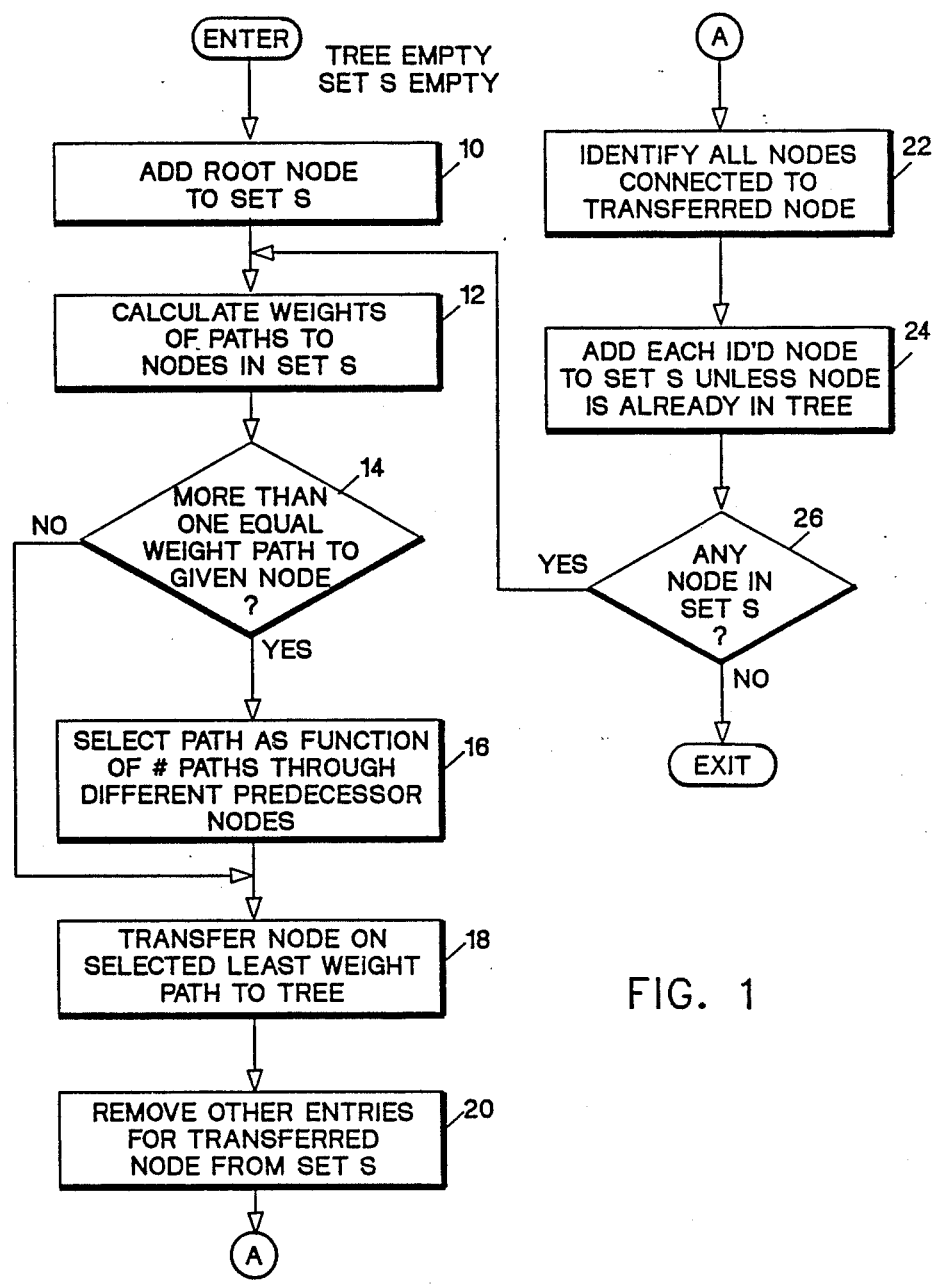
FIG. 1 is a flow chart of the improved route computation algorithm.

FIG. 1 is a flow chart of a least weight route computation method. The description of the method uses terms defined below.

A least weight tree is a map of least weight routes from a starting or root node to every other node in a network. Any two nodes in a tree are connected by a single path. When computing least weight routes, the tree is built a node at a time starting with the root node until every node is in the tree. A tree normally includes several branches from the root node to different nodes in the network.

A node Set S is a list of nodes which are connected directly to nodes already in the tree. Node Set S does not include nodes which are themselves in the tree. Each node entry in Set S has an associated temporary predecessor node, a temporary predecessor transmission group and a temporary weight. These terms are defined below.

A temporary predecessor node (TPN) is the tree node directly connected to the Set S node under consideration.

A temporary predecessor transmission group (TPTG) is the transmission group which connects the Set S node to its temporary predecessor node.

A temporary weight (TW) is a weight value consisting of the sum of the weights of the tree through the temporary predecessor node, the temporary predecessor transmission group and the Set S node.

The description of the method shown in FIG. 1 will be followed by an example of an application of that method to an arbitrarily defined network shown in FIG. 2. The example may make it easier to understand the method.

At the beginning of route computation, both the tree and Set S are empty. The root node is chosen and added (operation 10) to Set S. Operation 12 computes the weight of possible paths from the root node through the tree to the node in Set S. At the start of route computation, there are no such paths. The weight computed is the weight assigned to the root node itself. A check 14 is then made to see if there is more than one equal weight path in the paths identified in operation 12. With only the root node in Set S, there cannot be more than one path. If operation 14 had shown more than one equal weight path, one of those paths is selected in a quasi-random manner in an operation 16. The node in Set S having the least weight path from the root node is transferred to the tree in an operation 18. All other entries in Set S which are referenced to the transferred node are removed from Set S in an operation 20.

The significance of operation 12, 14, 16, 18 and 20 is limited at the start of route computation since only the root node exists in Set S and only the root node can be transferred to the tree. These operations are discussed below in greater detail with reference to later steps in route computation.

In an operation 22, all nodes in the network directly connected to tree nodes are identified. On a first pass, this of course includes only nodes connected to the root node. The nodes identified in operation 22 are added to Set S unless the identified nodes are already in the tree as the result of earlier route computations. In a first pass, every node connected to the root node is added to Set S. A check 26 is made to see whether any nodes remain in Set S. A negative response at check 26 should occur only at the conclusion of route computations.

Assuming that one or more nodes exist in Set S, a second pass at route computation occurs beginning at operation 12. If more than one node is connected to the root node, operation 12 will calculate the weights of paths to all of those nodes. On the second and later passes, operations 14 and 16 may or may not be a factor in selecting a route. This will be explained in detail later. In operation 18, the node having the least weight path is transferred to the tree. If different nodes are connected to the root node through paths with the same weight, one of those nodes is arbitrarily selected and transferred to the tree.

In later stages of route computation, multiple paths to the same node in Set S may be computed. If the node has the least weight path at any given stage and is transferred to the tree, the other paths to the same node are removed from Set S in the operation 20.

Each time a node in Set S is transferred to the tree, all nodes connected to the transferred node are identified and added to Set S, unless they are already in the tree. As a result, the route tree is built up one branch or node connection at a time until every node in the network is included on the tree. When that has occurred, the check 26 will show Set S to be empty; that is, the tree to have been completed.

The method described above may be more readily understood by reference to FIGS. 2 through 8. FIG. 2 is a map of a network including six nodes A, B, C, D, E and F interconnected by transmission groups TG1 through TG8. FIG. 3 is a table of weights arbitrarily assigned to the nodes and the transmission groups. It should be noted that no equal weight paths to given nodes will exist so that operations 14 and 16 will not come into play in the route computation to be described with reference to FIGS. 2 through 8. The role of the operations 14 and 16 will be described with reference to later figures.

Reference should be made to the following table as well as the figures to understand what is happening at various stages of the route computation.

| | | Route Computation Steps | | | |
|---|---|---|---|---|---|
| | | | Set S | | |
| Step | Tree | Node | TPN | TPTG | TW |
| 0 | — | A | — | — | 8 |
| 1 | A | B | A | TG1 | 19 |
| | | C | A | TG2 | 31 |
| | | D | A | TG3 | 30 |
| 2 | AB | C | A | TG2 | 31 |
| | | D | A | TG3 | 30 |
| | | F | B | TG4 | 33 |
| 3 | ABD | C | A | TG2 | 31 |
| | | F | B | TG4 | 33 |
| | | E | D | TG7 | 41 |
| | | C | D | TG6 | 53 |
| 4 | ABDC | F | B | TG4 | 33 |
| | | E | D | TG7 | 41 |
| | | F | C | TG5 | 45 |
| | | E | F | TG8 | 44 |
| 5 | ABDCF | E | D | TG7 | 41 |
| | | E | F | TG8 | 44 |

TPN - Temporary Predecessor Node
TPTG - Temporary Predecessor Transmission Group
TW - Temporary Weight In step 0, the root node or node A is added to the Set S in a first pass. Since there are no predecessor nodes or transmission groups for the root node, the root node is automatically transferred to the tree with the path weight being the weight assigned to the root node.

In step 1, the nodes connected to node A (nodes B, C and D) are added to Set S and the weight of the paths to each of these nodes is calculated. As can be seen in the table, node B has the least weight path to node A. As a consequence, node B is transferred to the tree, which then consists of the single branch shown in FIG. 4. The entries for nodes C and D remain in Set S.

In step 2, nodes connected to node B are identified (nodes A and F). Since node A is already in the tree, only node F is added to Set S. The weight of the path to node F via node B is calculated and compared to the weights of paths already defined in Set S. Since the A-D node path has the least weight value, node D is transferred to the tree, which takes the form shown in FIG. 5.

In step 3, nodes connected to transferred node D (nodes A, C and E) are identified. Since node A is already in that tree, only nodes C and E are added to Set S. The weights of two different paths to node C are computed. Since the path to node C via node A has the least weight of any of the paths in Set S, node C is transferred to the tree as shown in FIG. 6. The other Set S entry referencing node C (C via D) is removed from Set S.

In step 4, an additional route to node F, via node C is added to Set S. The least weight route in the remaining Set S entries (node F via node B) is transferred to the tree, shown in FIG. 7. The other Set S entry referencing node F (node F via node C) is deleted.

In step 5, an additional route to node E, via node F, is added to Set S. The least weight route in Set S (node E via node D) is transferred to the tree and the remaining entry (which references node E) is deleted from Set S. The method terminates once Set S is empty. The complete least weight tree is shown in FIG. 8.

There were no equally weighted paths leading to a node in the description above. In a typical data communications network, several equally weighted paths may lead to a particular node. To more uniformly distribute selected routes over equally weighted paths, the present invention adds a variable to the least weight route computation method. The added variable is equal to the number of equally weighted paths in a network leading to a particular node. If two or more sets of equally weighted paths lead to a particular node through different predecessor nodes, the variables for the predecessor nodes are used to determine the probability with which a path in one of the sets is selected. This is illustrated with reference to FIGS. 9 and 10.

FIG. 9 illustrates a six node network (nodes A through F) with interconnecting, weighted transmission groups. For purposes of illustration, it is assumed that zero weights are associated with the nodes. FIG. 10 is a portion of a route computation table showing the weights assigned to different paths from a root node (A) to a given node F. Inspection of the table and of the network map shows there are four equally weighted routes between node A and node F. Three of those routes are on paths including predecessor node E and one is on a path through predecessor node C. It will also be noted that the route computation table includes a numerical variable (3) associated with the set of routes through predecessor node E and a numerical variable (1) associated with the path through predecessor node C.

If a route to node F must be selected at a particular stage of the route computation process, the stored variables are used to establish the probability with which a particular one of the equally weighted routes is selected. Specifically, if X is a variable indicating the number of equally weighted routes in one possible set of routes and Y is a variable indicating the number of equally weighted routes in another possible set, then the equation $X/(X+Y)$ defines the probability with while a route will be selected from the set X.

For the network shown in FIG. 9, the use of this equation dictates that route ACF will be selected with a probability of 25% which a route from the set of routes including nodes A and E will be selected with a probability of 75% when selecting a route from node A to node F.

For purposes of later route computations, the stored variable indicating the number of possible equally weighted routes through node F must be updated to be the sum of equally weighted routes through the different predecessor nodes for F.

The same methodology can be used to choose between equally weighted endpoint transmission groups to a particular network node. If a new transmission group with a given weight W is added to the possible routes already including X number of possible routes also with the weight W, the new transmission group is selected with a probability of $1/(1+X)$.

While there has been described what is considered to be a preferred embodiment of the invention, variations and modifications in that embodiment will occur to those skilled in the art once they become aware of the basic inventive concepts. Therefore, it is intended that the appended claims shall be construed to include not only the preferred embodiment but all such variations and modifications as fall within the true spirit and scope of the invention.

We claim:

1. An improved method of selecting least weight routes through a communications network including network nodes interconnected by transmission groups, said nodes and transmission groups having associated weights, said method comprising the steps of:

(a) adding a selected root node to a tree;
(b) establishing a set comprising all network nodes connected to any node in the tree other than a network node already in the tree;
(c) calculating the weights of paths from the root node to each node in the set;
(d) selecting a path having the least weight or, if multiple paths to a given node have equal least weights, quasi-randomly selecting one of those multiple paths;
(e) transferring to the tree the node in the selected least weight path;
(f) removing any other entries for the transferred node from the set;
(g) repeating steps b through f until all nodes in the network have been transferred to the tree.

2. An improved method as defined in claim 1 wherein the step of quasi-randomly selecting a path further comprises the steps of:
determining the number of equally-weighted least weight paths which may exist to a given node through different predecessor nodes in the tree; and
selecting one of those paths as a function of the relative number of equally weighted paths existing through the different predecessor nodes.

3. An improved method as defined in claim 2, wherein the probability that a given path in a set of equally-weighted least weight paths will be selected is a function of the formula $a/(A+B+...n)$ where A is the number of equally weighted paths through a given predecessor node and $A+B+...n$ is the total of equally-weighted least weight paths through all predecessor nodes to the given node.

4. An improved method of selecting least weight routes through a communications network including network nodes interconnected by transmission groups, said nodes and transmission groups having associated weights, said method comprising the steps of:
(a) adding a selected root node to a tree;
(b) establishing a set comprising all network nodes connected to any node in the tree other than a network node already in the tree;
(c) calculating the weights of paths from the root node to each node in the set;
(d) recording the number of equally weighted paths leading to each node in the set from different predecessor nodes;
(e) selecting a path having the least weight or, if multiple paths to a given node have equal least weights, quasi-randomly selecting one of those multiple paths as a function of the recorded number of equally weighted paths through different predecessor nodes;
(f) transferring to the tree the node in the selected least weight path;
(g) removing any other entries for the transferred node from the set;
(h) repeating steps b through g until all nodes in the network have been transferred to the tree.

5. An improved method as defined in claim 4 wherein the probability that a given path in a set of equally-weighted least weight paths will be selected is a function of the formula $A/(A+B+...n)$ where A is the number of equally weighted paths through a given predecessor node and $A+B+...n$ is the total of equally-weighted least weight paths through all predecessor nodes to the given node.

* * * * *